United States Patent [19]

Kudo

[11] Patent Number: 5,802,068
[45] Date of Patent: Sep. 1, 1998

[54] MULTIPLEXING APPARATUS OF A PLURALITY OF DATA HAVING DIFFERENT BIT RATES

[75] Inventor: Yoshinobu Kudo, Tokyo, Japan

[73] Assignee: Nippon Steel Corporation, Tokyo, Japan

[21] Appl. No.: 668,328

[22] Filed: Jun. 25, 1996

[30] Foreign Application Priority Data

Jun. 30, 1995 [JP] Japan ................... 7-188251

[51] Int. Cl.⁶ ........................... H04J 3/07; H04J 3/22
[52] U.S. Cl. ............................. 370/538; 370/528
[58] Field of Search ........................... 370/538, 505, 370/506, 528, 511, 508, 231, 232, 233, 234, 252, 253; 348/423, 462, 518, 387, 390, 515

[56] References Cited

U.S. PATENT DOCUMENTS

| | | |
|---|---|---|
| 3,838,221 | 9/1974 | Schmidt et al. ................... 370/324 |
| 4,224,473 | 9/1980 | Kaul et al. ....................... 370/528 |
| 4,864,562 | 9/1989 | Murakami et al. ................. 356/407 |
| 5,650,825 | 7/1997 | Naimpally et al. ................. 370/528 |

Primary Examiner—Benedict V. Safourek
Assistant Examiner—Kenneth Vanderpuye
Attorney, Agent, or Firm—Pollock, Vande Sande & Priddy

[57] ABSTRACT

By constructing a plurality of packs from a first packet including first data having a high bit rate and a second packet including second data having a low bit rate, when the first data and the second data are multiplexed, it is first detected whether a data length of second data is smaller than a maximum data length of second packet or not. Subsequently, when it is detected that the data length of second data is smaller than the maximum data length of second packet, one pack is constructed by a redundancy data packet including redundancy data of a data length which is equal to a difference between the maximum data length of second packet and the data length of second data and the second packet.

15 Claims, 2 Drawing Sheets

5,802,068

MULTIPLEXING APPARATUS OF A PLURALITY OF DATA HAVING DIFFERENT BIT RATES

BACKGROUND OF THE INVENTION

1. Field of the Invention

The present invention relates to a multiplexing apparatus of a plurality of data having different bit rates and, more particularly, to a multiplexing apparatus suitable for multiplexing video data having a high bit rate and audio data having a low bit rate.

2. Description of the Related Art

Hitherto, in a technical field in which a large number of information (for example, signals such as image, voice, and the like) is processed by using various communicating apparatuses and computers, there is a demand to perform a transmission and a reception of a large number of information in a short time.

In recent years, a technique such that information to be transmitted and received is converted to a digital signal and, further, the digital signal is compressed and multiplexed by a unique method, thereby reducing an amount of information has been being developed. As an international standard using such a technique for compressing and multiplexing the digital signal, there is an MPEG (Moving Picture Experts Group) system.

The MPEG system can be used in a field such that an image signal and an audio signal are compressed at a high density and are recorded to a recording medium such as CD-ROM (compact disc-ROM), DVD (digital video disc) or the like or in a field such that a compressed signal of a digital satellite broadcast, a high definition television conference system, or the like is transmitted, thereby transmitting and receiving information.

According to the MPEG system, video data and audio data which were compressed are multiplexed by a multiplexing method by packets and is transmitted. Namely, after each of the compressed video data and audio data was divided into a stream of a proper length called a packet, it is time-divisionally transmitted every packet as a set of one or a plurality of packets of the video data and/or the audio data.

In case of multiplexing the video data of a high bit rate and the audio data of a low bit rate, however, if a length of video data and a length of audio data are equal, since the audio data of an amount corresponding to a time longer than that of the video data is inserted into one packet, a time which is required to form the packet of the audio data is remarkably longer than that to form the packet of the video data. Thus, in case of synchronously multiplexing the video data and audio data, in order to adjust the timings of the video data and the audio data, the video data has to be multiplexed after waiting a certain extent of time, so that there is a problem such that an initial delay increases. There is also a problem such that the increase in initial delay also results in an increase in capacity of a buffer for the video data which is provided for the input stage of the multiplexing apparatus.

To specifically explain the above problems, it is assumed that an occurrence frequency (namely, bit rate) of the video data is set to 1,200,000 bits/sec, a bit rate of the audio data is set to 64,000 bits/sec, a sampling frequency of the audio data is set to 32 kHz, an encoding layer of the audio data is set to "layer 2", an output rate of the whole multiplexed data is set to 1,500,000 bits/sec, a pack length is set to 2,324 bytes which is matched to a sector of a CD-ROM, and each packet length is set to 2,286 bytes.

In this instance, a time of a frame as a processing unit of the audio encoding is equal to 36 msec and a size of one frame is equal to 288 bytes. Therefore, data of an amount corresponding to about eight frames (namely, about 288 msec) is inserted into one packet. Thus, if the reproduction of the video data and the reproduction of the audio data are simultaneously started on the decoding side, the video data has to be multiplexed after waiting of only a similar time.

Now assuming that the video data is generated in an average way 43.2 kbytes are needed as a capacity of a video buffer. Actually, however, since a large amount of data is generally generated as a first picture of the video data, a capacity larger than the above-mentioned capacity is needed as a capacity of the video buffer.

SUMMARY OF THE INVENTION

It is an object of the invention to provide a multiplexing apparatus which can reduce an initial delay even when two digital data having different bit rates are synchronously multiplexed.

According to the invention, there is provided a multiplexing apparatus in which a plurality of set assemblies are constructed by a first set part including at least first data having a high bit rate and a second set part including at least second data having a low bit rate and the first data and the second data are multiplexed. The apparatus comprises means for detecting whether a data length of second data is smaller than a maximum data length of second set part or not. Also, means for constructing one of the plurality of set assemblies from a redundancy data set part including redundancy data of a data length which is equal to a difference between the maximum data length of the second set part and the data length of the second data and the second set part when the detecting means judge that the data length of the second data is smaller than the maximum data of the length second set part.

According to the invention, there is provided a multiplexing apparatus for multiplexing first data having a high bit rate, and second data having a low bit rate so as to form a set of programs by using the first set part including the first data and the second set part including the second data. The apparatus comprises calculating means for calculating a data length of the second set part in accordance with a predetermined parameter; varying means for adaptedly varying the data length of the second set part in accordance with a calculated result of the calculating means; and forming means for forming a set assembly including the second data by using the second set part in which the data length is varied by the varying means and a redundancy data set part corresponding to the data length of the varied portion.

According to the invention, there is further provided a video data/audio data multiplexing apparatus for forming a set of programs by using packets. The apparatus comprises audio packet data length calculating means for calculating a data length of an audio packet in accordance with a predetermined parameter; audio packet data length varying means for adaptedly varying a data length of the audio packet in accordance with a calculated result of the audio packet data length calculating means; and pack forming means for forming a pack including the audio data by using the audio packet and redundancy data packet.

According to the invention, there is further provided a multiplexing apparatus according to an MPEG (Moving Picture Experts Group) system, in which a plurality of packs are constructed from a first packet including at least video data having a high bit rate and a second packet including at least audio data having a low bit rate and in which the video data and the audio data are multiplexed. The apparatus comprises means for detecting whether a data length of audio data is smaller than a maximum data length of the second packet or not; and means for constructing one of the plurality of packs from a redundancy data packet including redundancy data of a data length which is equal to a difference between the maximum data length of packet of the audio data and the data length of audio data and a packet of the audio data when the detecting means judges that the data length of audio data is smaller than the maximum data length of second packet.

DESCRIPTION OF THE PREFERRED EMBODIMENTS

Figure 1:
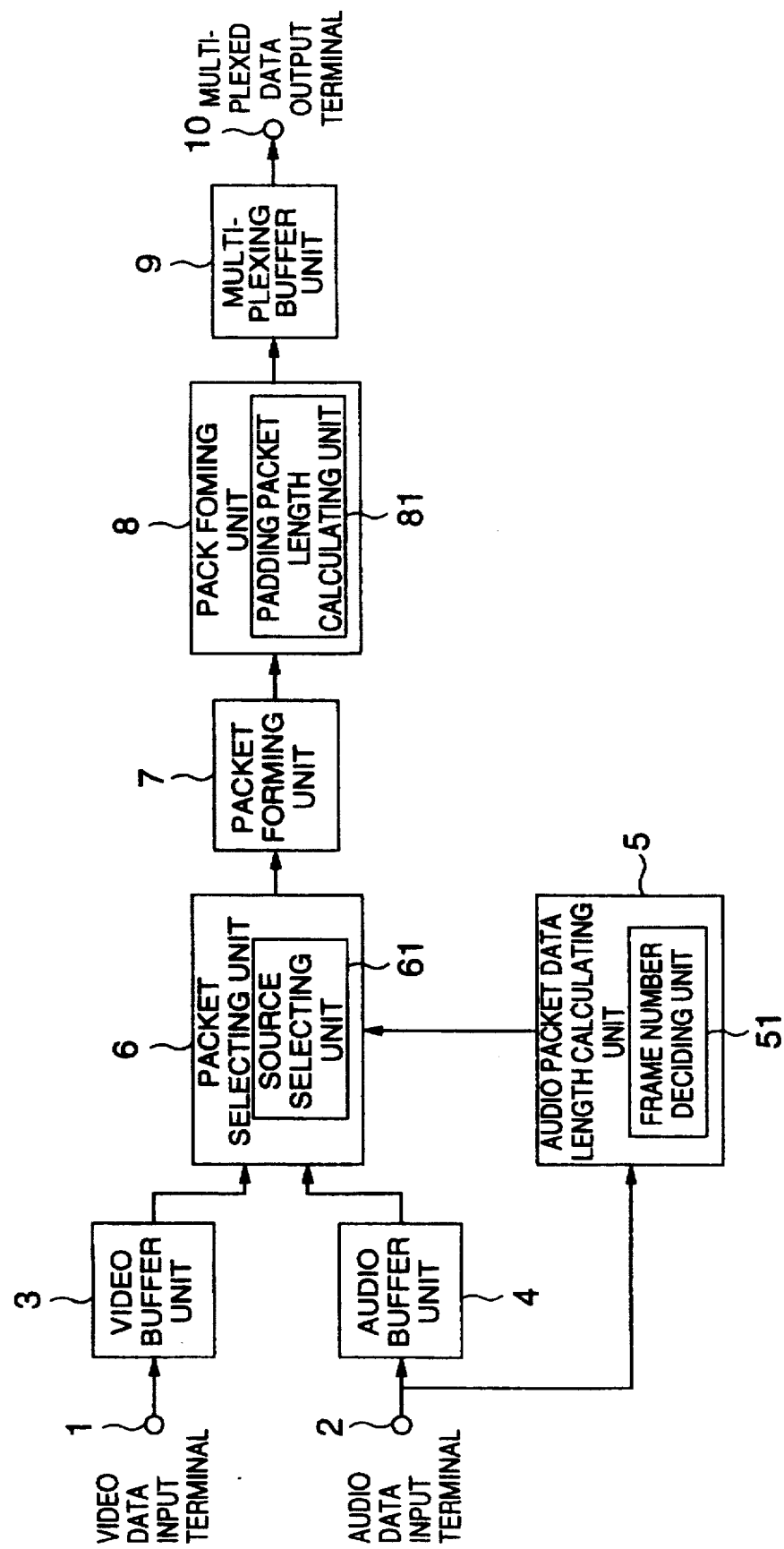
FIG. 1 is a block diagram showing an embodiment of a multiplexing apparatus of the invention.

As shown in FIG. 1, a video data/audio data multiplexing apparatus according to an embodiment of a multiplexing apparatus of the invention includes: a video data input terminal 1; an audio data input terminal 2; a video buffer unit 3; an audio buffer unit 4; an audio packet data length calculating unit 5 having a frame number deciding unit 51; a packet selecting unit 6 having a source selecting unit 61; a packet forming unit 7; a pack forming unit 8 having a padding packet length calculating unit 81; a multiplexing buffer unit 9; and a multiplexed data output terminal 10.

Video data which is encoded (data compressed) by a video data encoding apparatus (not shown) is inputted to the video data input terminal 1. Audio data which is encoded (data compressed) by an audio data encoding apparatus (not shown) is inputted to the audio data input terminal 2. The video buffer unit 3 temporarily stores the video data which is inputted from the video data input terminal 1. The audio buffer unit 4 temporarily stores the audio data which is inputted from the audio data input terminal 2.

The audio packet data length calculating unit 5 calculates a proper data length of the audio packet (audio packet data length) on the basis of a bit rate of the audio data which is inputted from the audio data input terminal 2, an encoding layer, a sampling frequency, a length of pack to be multiplexed, and the like and outputs a calculation result to the packet selecting unit 6. The frame number deciding unit 51 decides the number of frames so as to improve a multiplexing efficiency when the bit rate is changed from a middle bit rate to a high bit rate.

The packet selecting unit 6 has the source selecting unit 61 for selecting any one of the video data, audio data, and padding data (redundancy data) on the basis of a situation in which the data is generated, a virtual situation of a buffer in a separating/decoding apparatus, and the like. When the source selecting unit 61 selects the video data, the packet selecting unit 6 reads out the video data of an amount corresponding to a packet data length from the video buffer unit 3 and outputs the video data. When the source selecting unit 61 selects the audio data, the packet selecting unit 6 reads out the audio data of an amount corresponding to an audio packet data length which is inputted from the audio packet data length calculating unit 5 from the audio buffer unit 4 and outputs. When the audio packet data length is smaller than the packet data length, the packet selecting unit 6 forms the padding data of a data length that is equal to a difference between those data lengths, and outputs the padding data.

The packet forming unit 7 forms a packet from the data which is inputted from the packet selecting unit 6. That is, when the video data of the amount corresponding to the packet data length is inputted from the packet selecting unit 6, the packet forming unit 7 adds a packet header to the video data, thereby forming a video packet (refer to FIG. 2). When the audio data of the amount corresponding to the audio packet data length is inputted from the packet selecting unit 6, the packet forming unit 7 adds the packet header to the audio data, thereby forming an audio packet (refer to FIG. 2). Further, in the case where the padding data of an amount corresponding to a difference between the packet data length and the audio packet data length is inputted from the packet selecting unit 6, the packet forming unit 7 adds a padding header to the padding data, thereby forming a padding packet (refer to FIG. 2). In this instance, packet header information such as the packet start code, time stamp indicative of a decoding timing, or the like is inserted to the packet header.

Figure 2:
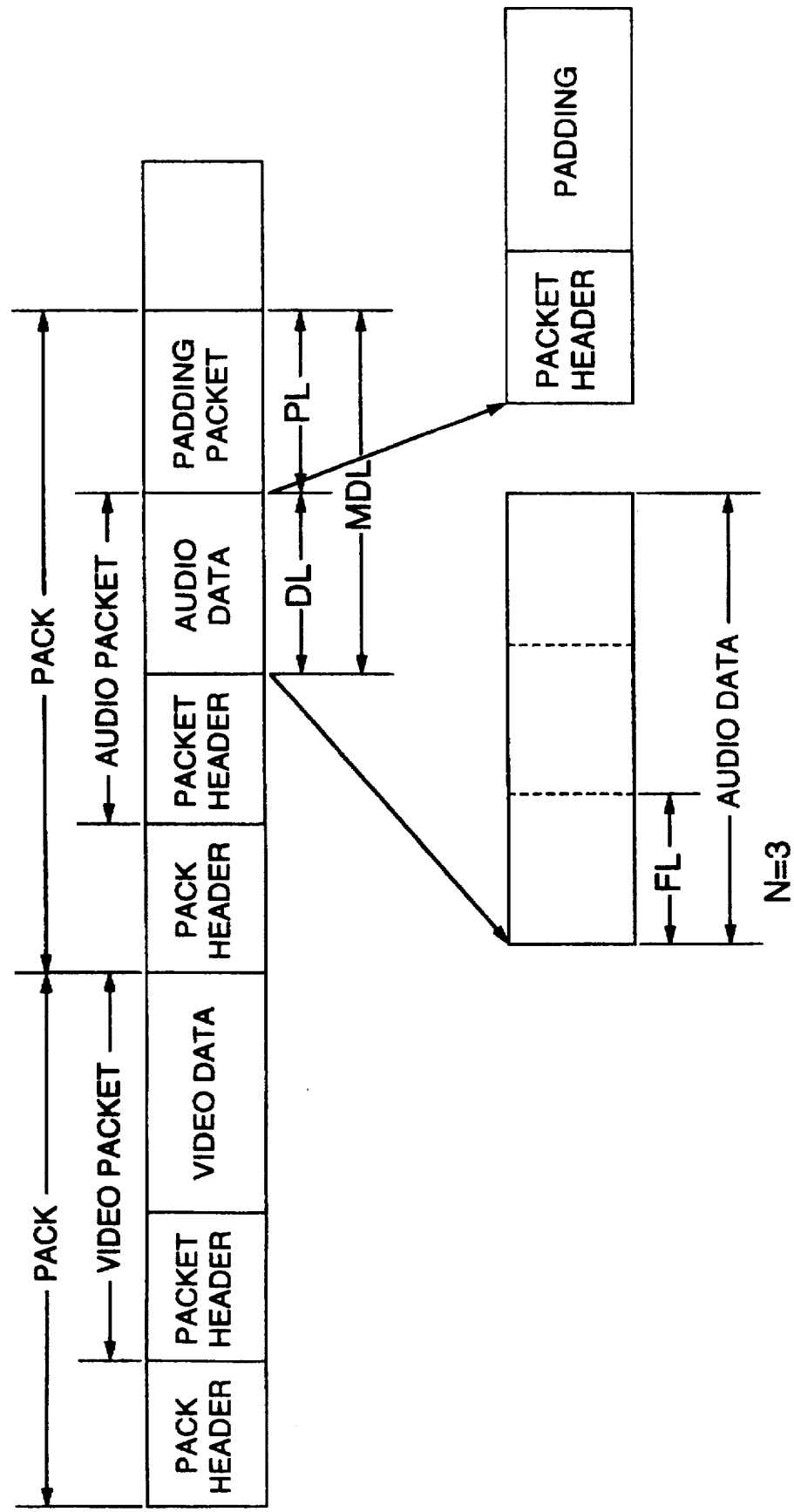
FIG. 2 is a diagram showing an example of a data structure of multiplexed data which is outputted from the multiplexing apparatus shown in FIG. 1.

In the case where the video packet is inputted from the packet forming unit 7, the pack forming unit 8 adds a pack header to the video packet, thereby forming one pack (refer to FIG. 2). When an audio packet and/or a padding packet is inputted from the packet forming unit 7, the pack forming unit 8 adds a pack header to the audio packet and/or padding packet, thereby forming one pack (refer to FIG. 2). A length of padding packet is obtained by the padding packet length calculating unit 81 in corresponding to the length of the pack including the audio data and the length of audio packet. Pack header information such as a pack identification code or the like is inserted into the pack header. The pack forming unit 8 forms multiplexed data constructed by a plurality of packs and outputs the multiplexed data.

The multiplexing buffer unit 9 temporarily stores the multiplexed data which is inputted from the pack forming unit 8, adjusts a burst performance, and after that, outputs the resultant data to the outside through the multiplexed data output terminal 10.

The operation of the video data/audio data multiplexing apparatus will now be described.

The video data inputted from the video encoding apparatus (not shown) to the video data input terminal 1 is temporarily stored in the video buffer unit 3 in order to be multiplexed with the audio data, while taking into account that decoding is to be performed so that the both data can be simultaneously reproduced on a decoding apparatus (not shown) side. Similarly, the audio data inputted from the audio data encoding apparatus to the audio data input terminal 2 is also temporarily stored in the audio buffer unit 4.

In the audio packet data length calculating unit 5, a proper audio packet data length is calculated on the basis of a bit rate of the audio data input from the audio data input terminal 2, an encoding layer, a sampling frequency, a length of pack to be multiplexed, and the like, as described below.

The number of bytes of one frame FL is obtained by using the number of samples of one frame SP, a sampling frequency SF, and a bit rate (a unit is a bit) BR of the audio data by the following equation.

$$FL = (SP/SF) \times (BR/8) \tag{1}$$

When the sampling frequency and encoding layer are constant, even if the bit rate changes, the time of one frame is also constant. Therefore, an audio packet data length DL is obtained by using the number N of frames by the following equation.

$$DL = N \times FL \quad (2)$$

As a result of the calculation, in the case where the audio packet data length DL is larger than a maximum data length MDL of the packet which is permitted in the pack, the audio packet length DL is set to the maximum data length MDL of the packet as shown by the following equation.

$$DL = MDL \quad (3)$$

In this instance, the maximum data length MDL of the packet is obtained by using a pack length PA, a pack header length PH, and an audio packet header length AH by the following equation.

$$MDL = PA - PH - AH \quad (4)$$

In the frame number deciding unit 51 provided for the audio packet data length calculating unit 5, the number N of frames is set to a value such that the data length DL of the audio packet exceeds the maximum data length MDL of the packet at a middle bit rate. This is to improve a multiplexing efficiency when the bit rate is changed from the middle bit rate that is generally used to a high bit rate. The value of the number N of frames is set to a time of the initial delay as it is.

In the source selecting unit 61 of the packet selecting unit 6, on the basis of a generating situation of the data, a virtual situation of the buffer of the separating/decoding apparatus, and the like, it is judged whether the decoding is smoothly executed by inserting one of the video data packet and the audio data packet into the pack to be transmitted. Thus, either one of the video data and the audio data is selected.

In the packet selecting unit 6, when the video data is selected by the source selecting unit 61, the video data of an amount corresponding to the packet data length is read out from the video buffer unit 3 and is outputted. In the case where the audio data is selected by the source selecting unit 61, the audio data of an amount corresponding to the audio packet data length which is inputted from the audio packet data length calculating unit 5 is read out from the audio buffer unit 4 and is outputted. When the audio packet data length is smaller than the packet data length, padding data of a data length which is equal to a difference between the both data lengths is formed and outputted.

In the packet forming unit 7, a packet is formed from the data which is inputted from the packet selecting unit 6. That is, in the case where the video data of the amount corresponding to the packet data length is inputted from the packet selecting unit 6, the packet header is added to the video data, thereby forming a video packet (refer to FIG. 2). When the audio data of the amount corresponding to the audio packet length is inputted from the packet selecting unit 6, a packet header is added to the audio data, thereby forming an audio packet (refer to FIG. 2). Further, in the case where the padding data of an amount corresponding to the difference between the packet data length and the audio packet data length is inputted from the packet selecting unit 6, a padding header is added to the padding data, thereby forming a padding packet (refer to FIG. 2). In this instance, packet header information, such as a packet start code, a time stamp indicative of a decoding time, and the like, is inserted into the packet header.

In the pack forming unit 8, when the video packet is inputted from the packet forming unit 7, a pack header is added to the video packet, thereby forming one pack (refer to FIG. 2). In the case where the audio packet and/or the padding packet is inputted from the packet forming unit 7, the pack header is added to the audio packet and/or the padding packet, thereby forming one pack (refer to FIG. 2). A length of the padding packet at this time is obtained in accordance with the length of the pack including the audio data and the length of the audio packet by the padding packet length calculating unit 81. That is, a length PL of padding packet is obtained by using the maximum data length MDL of the audio packet and the audio packet data length DL by the following equation.

$$PL = MDL - DL \quad (5)$$

Pack header information such as a pack identification code and the like is inserted into the pack header. Multiplexed data constructed by a plurality of packs is outputted from the pack forming unit 8.

In the multiplexing buffer unit 9, the multiplexed data which is inputted from the pack forming unit 8 is temporarily stored, its burst performance is adjusted, and after that, the resultant data is outputted to the outside through the multiplexed data output terminal 10.

A structure of the multiplexed data which was multiplexed by the video data/audio data multiplexing apparatus in the embodiment will now be described with reference to FIG. 2.

As shown in FIG. 2, the multiplexed data is constructed by a plurality of continuous packs. Each pack is constructed by the packet and the pack header indicative of information such as time reference information and the like. A system header indicative of an outline of the whole stream is further added to the head pack (the system header can be also added to the second and subsequent packs).

In the present embodiment, the video packet and the audio packet or audio packet, and padding packet, are included in one pack. The pack including the audio packet is constructed by the pack header, the audio packet, and the padding packet of the length PL obtained by the foregoing equation (5). Therefore, in the case where the audio packet data length DL, which is added to the audio packet, is equal to the maximum data length MDL of the audio packet, the padding packet is not added to the pack including the audio packet.

The example shown in FIG. 2 shows a case where the number N of frames is set to "3" and the audio packet data length DL is smaller than the maximum data length MDL of audio packet. Namely, according to the above-mentioned specific example, when it is assumed that the number N of frames is set to "3", the audio packet data length DL is equal to 864 bytes. When it is assumed that the header length of audio packet is set to 14 bytes, the maximum data length MDL of audio packet is equal to 2272 bytes, so that the length of padding packet is equal to 1408 bytes.

Since the number N of frames is equal to "3", the initial delay which is caused by the audio data is equal to 108 msec. Now assuming that the video data is generated averagely since a capacity of the input video buffer is equal to 16.2 kbytes, the initial delay can be reduced to 40% or less of the conventional initial delay.

The embodiment of the invention has been described above with respect to the case of multiplexing the video data and audio data on the basis of the MPEG standard as an example. As data to be multiplexed by the multiplexing apparatus according to the invention, however, data other than the video data and audio data can be also used. As a data compressing and multiplexing technique, a technique other than the MPEG system can be also used.

As mentioned above, according to the invention, for example, when the video data of a high bit rate and the audio data of a low bit rate are multiplexed, since the length of packet including the audio data can be adapted depending on the bit rate, the initial delay that is caused due to the audio data can be remarkably reduced and the buffer capacity at the input stage can be also suppressed to a small capacity.

What is claimed is:

1. A multiplexing apparatus in which a plurality of set assemblies are constructed by a first set part including at least first data having a high bit rate and a second set part including at least second data having a low bit rate, and said first data and said second data are multiplexed, comprising:

means for detecting whether a data length of said second data is smaller than a maximum data length of said second set part or not; and means for constructing one of said plurality of set assemblies from a redundancy data set part, which includes redundancy data of a data length that is equal to a difference between the maximum data length of said second set part and the data length of said second data, and said second set part when said detecting means judges that the data length of said second data is smaller than the maximum data length of said second set part.

2. An apparatus according to claim 1, wherein said multiplexing apparatus is a multiplexing apparatus according to an MPEG (Moving Picture Experts Group) system, and said first data is video data, said second data is audio data, and said redundancy data is padding data.

3. A multiplexing apparatus according to claim 1, wherein said first data is video data, said second data is audio data, and said redundancy data is padding data.

4. A multiplexing apparatus for multiplexing first data having a high bit rate and second data having a low bit rate so as to form a set of programs by using a first set part including said first data and a second set part including said second data, comprising:

calculating means for calculating a data length of said second set part in accordance with a predetermined parameter;

varying means for adaptedly varying the data length of said second set part in accordance with a calculation result of said calculating means; and forming means for forming a set assembly including said second data by using said second set part whose data length is varied by said varying means and a redundancy data set part corresponding to the data length of a varied portion.

5. A multiplexing apparatus according to claim 4, wherein said first data is video data, and said second data is audio data.

6. A video data/audio data multiplexing apparatus for forming a set of programs by using packets, comprising:

audio packet data length calculating means for calculating a data length of an audio packet in accordance with a predetermined parameter;

audio packet data length varying means for adaptedly varying the data length of said audio packet in accordance with a calculation result of said audio packet data length calculating means; and pack forming means for forming a pack including said audio data by using said audio packet and a redundancy data packet.

7. An apparatus according to claim 6, wherein said audio packet data length calculating means obtains said audio packet length by using a bit rate of the inputted audio data, a sampling frequency, an encoding layer, and a length of pack to be multiplexed.

8. An apparatus according to claim 6, wherein said audio packet data length calculating means obtains a data length of said audio packet by using one frame of said audio data as a unit.

9. An apparatus according to claim 6, further having redundancy data packet length calculating means for obtaining a length of said redundancy data packet in accordance with a length of pack including said audio data and a length of said audio packet.

10. An apparatus according to claim 6, further having frame number deciding means for deciding the number of frames so as to improve a multiplexing efficiency when a bit rate is changed from a middle bit rate to a high bit rate.

11. An apparatus according to claim 7, further having frame number deciding means for deciding the number of frames so as to improve a multiplexing efficiency when a bit rate is changed from a middle bit rate to a high bit rate.

12. An apparatus according to claim 8, further having frame number deciding means for deciding the number of frames so as to improve a multiplexing efficiency when a bit rate is changed from a middle bit rate to a high bit rate.

13. An apparatus according to claim 9, further having frame number deciding means for deciding the number of frames so as to improve a multiplexing efficiency when a bit rate is changed from a middle bit rate to a high bit rate.

14. An apparatus according to claim 6, further having source selecting means for selecting a source to be multiplexed in said pack from among the video data and the audio data and redundancy data all of which are inputted.

15. A multiplexing apparatus according to an MPEG (Moving Picture Experts Group) system in which a plurality of packs are constructed by a first packet including at least video data having a high bit rate and a second packet including at least audio data having a low bit rate, and said video data and said audio data are multiplexed, comprising:

means for detecting whether a data length of said audio data is smaller than a maximum data length of said second packet or not; and means for constructing one of said plurality of packs from a redundancy data packet, which includes redundancy data of a data length which is equal to a difference between the maximum data length of packet of said audio data and the data length of said audio data, and the packet of said audio data when said detecting means judges that the data length of said audio data is smaller than the maximum data length of said second packet.

* * * * *